(12) United States Patent
Williams et al.

(10) Patent No.: US 11,643,862 B2
(45) Date of Patent: May 9, 2023

(54) SENSOR MODULE FOR VEHICLE CARGO DOOR

(71) Applicant: Toyota Motor Engineering & Manufacturing North America, Inc., Plano, TX (US)

(72) Inventors: Paxton S. Williams, Milan, MI (US); Scott P. Robison, Dexter, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 1030 days.

(21) Appl. No.: 16/411,864

(22) Filed: May 14, 2019

(65) Prior Publication Data

US 2020/0362617 A1   Nov. 19, 2020

(51) Int. Cl.
| | |
|---|---|
| *E05F 15/42* | (2015.01) |
| *E05F 15/75* | (2015.01) |
| *E05F 15/60* | (2015.01) |
| *E05F 15/70* | (2015.01) |
| *G01L 5/00* | (2006.01) |
| *B62D 33/03* | (2006.01) |

(52) U.S. Cl.
CPC .............. *E05F 15/75* (2015.01); *E05F 15/42* (2015.01); *G01L 5/00* (2013.01); *B62D 33/03* (2013.01); *E05Y 2900/546* (2013.01)

(58) Field of Classification Search
CPC . E05F 15/42; E05F 15/70; E05F 15/60; E05F 15/75; G01L 5/00
See application file for complete search history.

(56) References Cited

U.S. PATENT DOCUMENTS

| | | | |
|---|---|---|---|
| 5,949,207 A | 9/1999 | Luebke et al. | |
| 6,588,151 B1 | 7/2003 | Goscicki et al. | |
| 6,651,385 B2 | 11/2003 | Miller et al. | |
| 8,033,052 B2 | 10/2011 | Kraus et al. | |
| 9,470,034 B2 * | 10/2016 | Ihlenburg | E05F 15/73 |
| 10,613,219 B1 * | 4/2020 | DeCia | E05F 15/73 |
| 10,941,602 B2 * | 3/2021 | Ghannam | E05F 15/40 |
| 2007/0262603 A1 * | 11/2007 | Robertson | B62D 33/0273 296/57.1 |
| 2016/0160553 A1 * | 6/2016 | Nania | E05F 15/627 296/50 |
| 2019/0078371 A1 | 3/2019 | Pohl et al. | |
| 2019/0330907 A1 * | 10/2019 | Marchlewski | B62D 33/0273 |
| 2020/0141171 A1 * | 5/2020 | Ghannam | B60Q 1/50 |

FOREIGN PATENT DOCUMENTS

| | | |
|---|---|---|
| CN | 108894639 | 11/2018 |
| DE | 102017201464 A1 | 8/2018 |

* cited by examiner

*Primary Examiner* — Thai T Dinh
(74) *Attorney, Agent, or Firm* — Christopher G. Darrow; Darrow Mustafa PC

(57) ABSTRACT

A sensor module for a vehicle includes a housing structured to be mounted along a sidewall of a cargo door, and a pressure-sensitive sensor mounted in the housing so as to be extendible from the housing and retractable into the housing. A sensor deployment mechanism is operatively coupled to the sensor and is structured to be operable to extend the sensor from the housing and to retract the sensor into the housing.

9 Claims, 7 Drawing Sheets

SENSOR MODULE FOR VEHICLE CARGO DOOR

The subject matter described herein relates in general to vehicle sensors and, more particularly, to a vehicle sensor designed to detect an obstruction to closing of a vehicle door.

BACKGROUND

An object may extend from a vehicle cargo area between a body of the vehicle and a door of a cargo area, to an exterior of the vehicle when the door is automatically closing. Detection of such an object may be desirable to prevent damage to the object and to enable the door to close.

SUMMARY OF THE INVENTION

In one aspect of the embodiments described herein, a sensor module for a vehicle is provided. The sensor module includes a housing structured to be mounted along a sidewall of a cargo door, and a pressure-sensitive sensor mounted in the housing so as to be extendible from the housing and retractable into the housing. A sensor deployment mechanism is operatively coupled to the sensor and is structured to be operable to extend the sensor from the housing and to retract the sensor into the housing.

In another aspect of the embodiments described herein, a sensor system for a vehicle is provided. The sensor system includes a housing and a pressure-sensitive sensor mounted in the housing so as to be extendible from the housing and retractable into the housing. A sensor deployment mechanism is operatively coupled to the sensor and is structured to be operable to extend the sensor from the housing and to retract the sensor into the housing. A sensor controller of the sensor system includes one or more processors for controlling operation of the controller, and a memory for storing data and program instructions usable by the one or more processors, wherein the one or more processors are configured to execute instructions stored in the memory to operate the sensor deployment mechanism to extend the sensor from the housing prior to movement of a cargo door of the vehicle responsive to a command to automatically close the cargo door.

BRIEF DESCRIPTION OF THE DRAWINGS

The accompanying drawings, which are incorporated in and constitute a part of this specification, illustrate embodiments described herein and together with the description serve to explain principles of embodiments described herein.

DETAILED DESCRIPTION

Figure 1A:
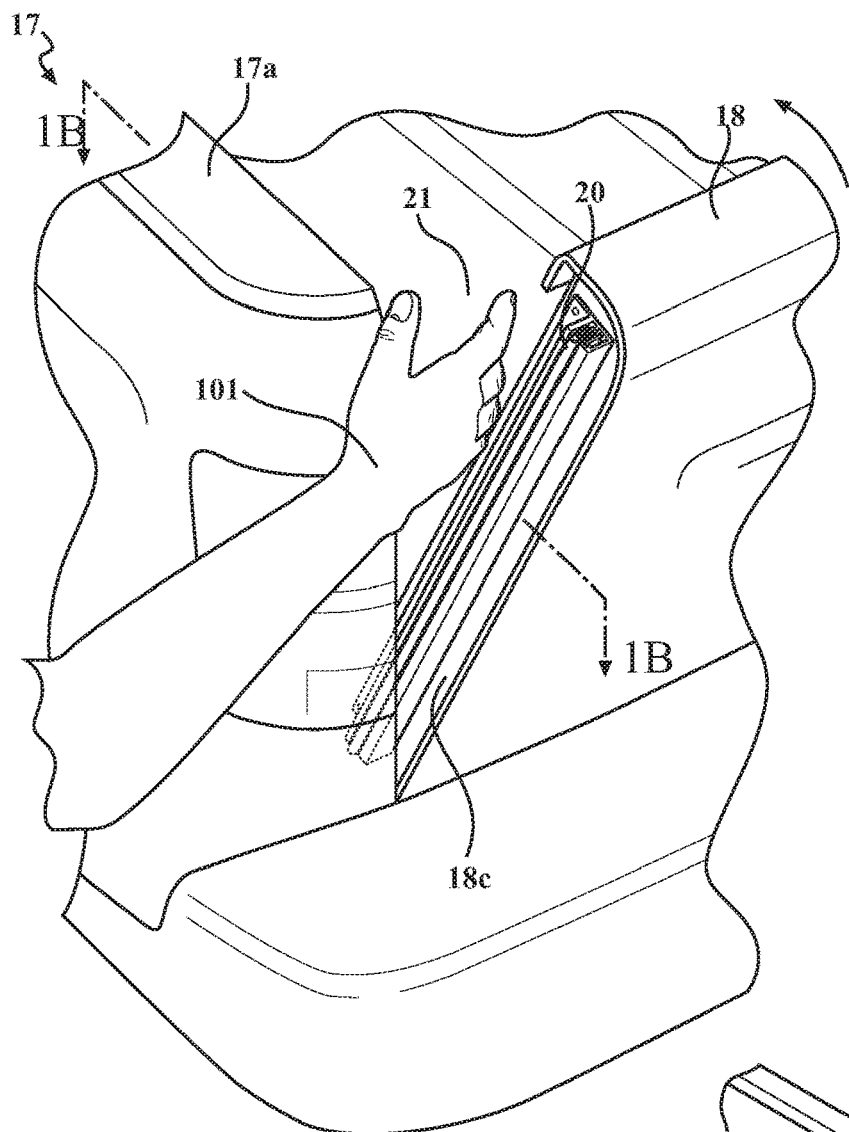
FIG. 1A is a schematic perspective view of a portion of a vehicle including a tailgate incorporating a sensor module in accordance with an embodiment described herein, and showing the tailgate in an open condition while the tailgate is in the process of automatically closing.
Figure 2A:
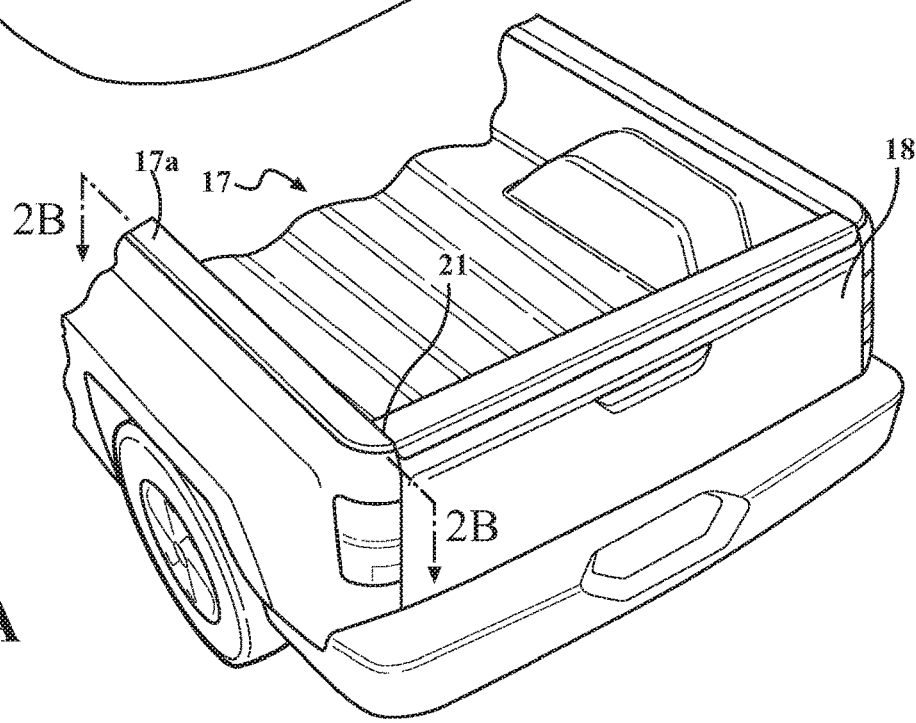
FIG. 2A is the schematic perspective view of FIG. 1A showing the tailgate in a fully or completely closed condition.

In one or more arrangements described herein, a sensor module for a vehicle is provided. The sensor module includes a housing structured to be mounted along a sidewall of a cargo door, and a pressure-sensitive sensor mounted in the housing so as to be extendible from the housing and retractable into the housing. A sensor deployment mechanism is operatively coupled to the sensor and is structured to be operable to extend the sensor from the housing and to retract the sensor into the housing. The sensor module may be structured to extend the sensor from the housing when the cargo door is automatically closing. The sensor may be a contact sensor configured to detect an object residing within a seam formed between the cargo door and a body of the vehicle when the door is closing. When the sensor contacts the object, a signal may be generated which stops motion of the cargo door and prevents further closing of the cargo door. This may aid in preventing damage to the object and to the door mechanism.

Detailed embodiments are disclosed herein; however, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-6, but the embodiments are not limited to the illustrated structure or application.

It will be appreciated that for simplicity and clarity of illustration, where appropriate, reference numerals have been repeated among the different figures to indicate corresponding or analogous elements and/or features. In addition, similar reference numerals in different figures refer to elements common to the different figures. Also, numerous specific details are set forth in order to provide a thorough understanding of the embodiments described herein. However, it will be understood by those of ordinary skill in the art that the embodiments described herein can be practiced without these specific details.

FIG. 1A is a schematic perspective view of a rear portion of a vehicle 17 incorporating a sensor module (generally designated 20) in accordance with an embodiment described herein, designed to be mounted on a vehicle cargo door. In the particular embodiment shown in FIG. 1A, the sensor module 20 is shown mounted on a sidewall of a cargo door in the form of a vehicle tailgate 18. The tailgate 18 may be a tailgate of a pickup truck, for example. Alternatively, embodiments of the sensor module described herein may be mounted on a hatchback door or any other rotatable vehicle cargo door. Although the sensor module 20 is shown positioned along a first or left sidewall 18c of the tailgate 18, another, similar sensor module may also be positioned along a second or right sidewall (not shown) of the tailgate. The other sensor module may also operate as described herein. A vehicle cargo door may be defined as any door enabling access to a vehicle cargo area.

The sensor module 20 may be configured to detect the presence of an object (such as a forearm 101 of a user, for example) extending into what would be a seam 21 between the tailgate 18 and a vehicle sidewall 17a adjacent the tailgate 18 if the tailgate is fully closed.

Figure 2B:
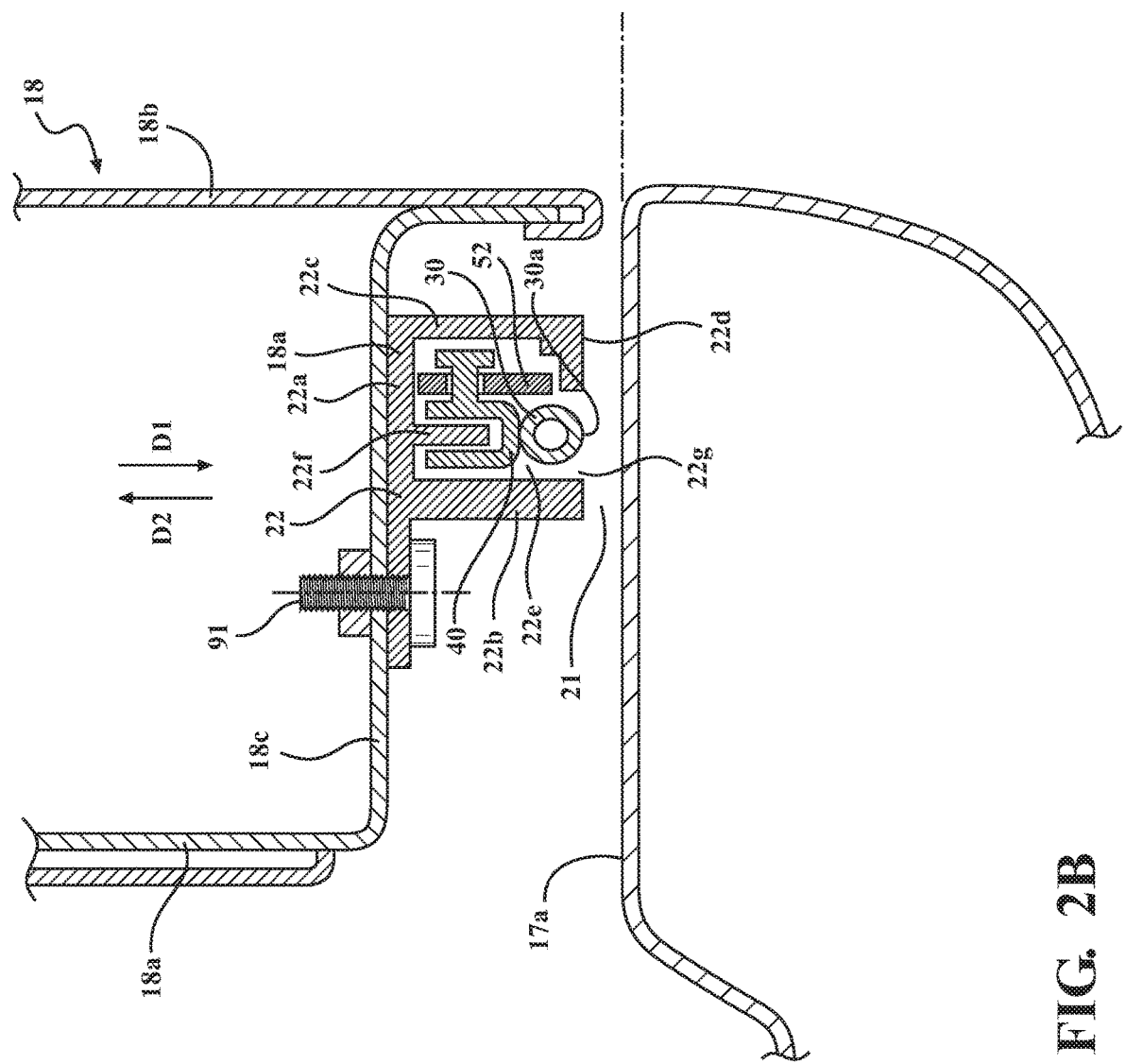
FIG. 2B is a schematic plan view of the portion of the vehicle shown in FIG. 2A.

Referring to the drawings, in one or more arrangements, the sensor module 20 includes a housing 22 structured to be mounted along the sidewall 18c of the tailgate 18. As seen in FIGS. 2B and 3B, the tailgate 18 may include a forward panel 18a, a rear panel 18b, and the sidewall 18c extending between the forward panel and the rear panel. Housing 22 may include a base wall 22a, a first outer wall 22b extending from the base wall 22a, and a second outer wall 22c extending from the base wall 22a opposite the first outer wall 22b. A ledge 22d may extend from the second outer wall 22c in a direction toward the first outer wall 22b. Housing 22 may be secured to the tailgate sidewall 18c using one or more bolts 91.

In combination, base wall 22a, first outer wall 22b, second outer wall 22c, and ledge 22d may define a housing cavity 22e in which a sensor 30 (described below) is received. A sensor guide 22f may extend from the base wall 22a into the cavity 22e, for purposes described below. A separation between the ledge 22d and the first outer wall 22b provides an opening 22g in the housing 22 through which the sensor 30 moves during extension and retraction. In addition, walls 22a-22c and ledge 22d may be dimensioned such that one or more of first outer wall 22b and ledge 22d extend farther from the tailgate sidewall 18c than an outermost edge 30a of the sensor when the sensor 30 is retracted into the housing 22. This arrangement may aid in protecting the sensor 30 from damage. The sensor outermost edge 30a may be an edge closest to the vehicle sidewall 17a.

The sensor module 20 may also include pressure-sensitive sensor 30 mounted in the housing 22 so as to be extendible from the housing 22 and retractable into the housing. Sensor 30 may be a contact sensor such as a conventional "pinch" sensor structured as a longitudinal strip. The sensor 30 may be configured to detect (and react to) contact with an object residing in the vehicle tailgate-sidewall seam 21.

The sensor 30 may be rigidly coupled to a sensor base 40. In one or more arrangements, sensor 30 may be attached to or formed integrally with the sensor base 40. Sensor base 40 and the attached sensor 30 may be structured to be freely slidable with housing cavity 22e in an extension direction D1 of the sensor 30 (with respect to housing 22) and also in a retraction direction D2 opposite the extension direction D1. Thus, as the sensor base 40 moves in the extension direction D1 of the sensor, the attached sensor 30 will also move in this direction, thereby extending the sensor 30 from the housing 22. Similarly, as the sensor base 40 moves in the retraction direction D2 of the sensor, the attached sensor 30 will also move in direction D2, thereby retracting the sensor 30 into the housing.

Figure 1B:
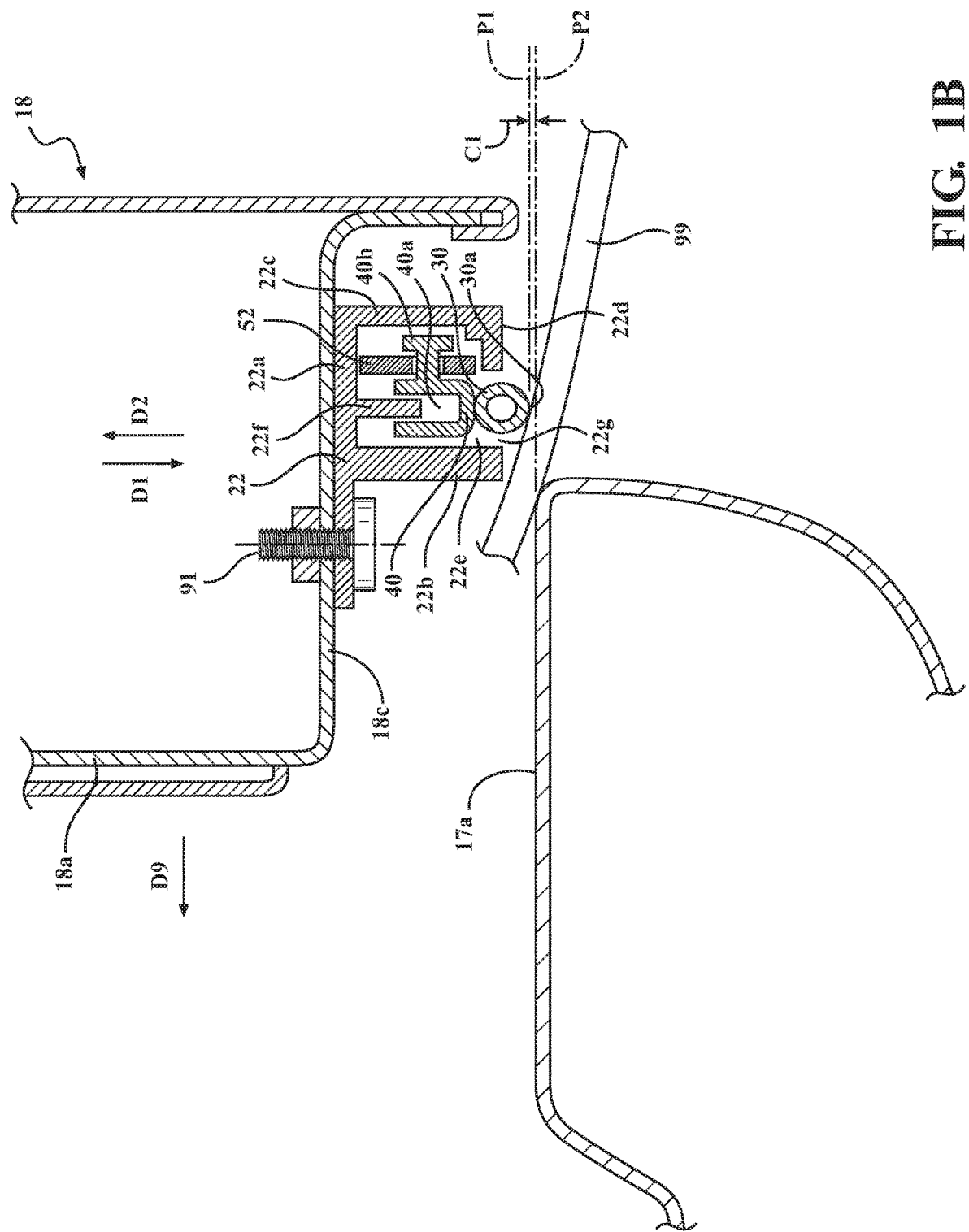
FIG. 1B is a schematic plan view of the portion of the vehicle shown in FIG. 1A.

Referring to FIGS. 1B and 2B, sensor base 40 may include a slot 40a formed therein. Sensor base slot 40a may be structured to receive sensor guide 22f therein. The sensor guide 22f and sensor base slot 40a may be structured so that the sensor guide 22f always resides in the sensor base slot 40a as the sensor base 40 moves in directions D1 and D2 during extension and retraction of the sensor 30. This structure may aid in maintaining alignment of the sensor 30 with the housing opening 22g.

In addition, at least one projection may be rigidly coupled to the sensor. In one or more arrangements, one or more projections may be coupled to the sensor 30 by extending the projections from the sensor base 40 attached to the sensor 30. The embodiment described herein includes a pair of projections 40b, 40c extending from the sensor base. However, a single projection or more than two projections may extend from the sensor base 40, depending on such factors as the length of the sensor 30 being employed and other pertinent factors.

As described in greater detail below, each of projections 40b, 40c may be structured to be received in an associated slot formed in a reciprocating member 52 of a sensor deployment mechanism 50 (described below). Engagement between the projections 40b, 40c and the reciprocating member 52 may be used as described herein to extend and retract the sensor 30.

The sensor module 20 may include a sensor deployment mechanism (generally designated 50) operatively coupled to the sensor 30 and structured to be operable to extend the sensor 30 from the housing 22 and to retract the sensor into the housing.

In one or more arrangements, the sensor deployment mechanism 50 may include reciprocating member 52. The sensor 30 may be operatively coupled to the reciprocating member 52 so that motion of the reciprocating member in a first reciprocating member direction D3 (FIG. 3A) causes the sensor 30 to move in the retraction direction D2 so as to retract into the housing 22. The sensor retraction direction D2 may be perpendicular to the first reciprocating member direction D3. In addition, motion of the reciprocating member 52 in a second reciprocating member direction D4 (FIG. 4A) opposite the first reciprocating member direction D3 causes the sensor 30 to move in the extension direction D1 so as to extend from the housing 22.

In embodiments described herein, the sensor 30 is operatively coupled to the reciprocating member 52 by the extension of sensor base projections into slots 52b, 52c of the reciprocating member 52. Projections 40b, 40c are slidably received in the slots 52b, 52c, respectively. As seen in FIGS. 3A-4B, each of the slots 52b, 52c may be structured to extend at a non-zero angle with respect to the first and second reciprocating member directions D3, D4, and also with respect to the extension direction D1 and retraction direction D2.

The sensor deployment mechanism 50 may also include an actuator 54 operatively coupled to the reciprocating member 52 and structured to move the reciprocating member in the first reciprocating member direction D3 and in the second reciprocating member direction D4. Any suitable actuator can be used. For example, referring to FIGS. 3A and 4A, a rack gear (not shown) may be incorporated into a connecting member 53 which operatively couples the reciprocating member 52 to an actuator 54 in the form of a motor (not shown). A shaft of the motor may have a pinion gear mounted thereon and in engagement with the rack gear. The motor may be operated to rotate the shaft and pinion gear, thereby moving the attached reciprocating member 52 in directions D3 and D4 as needed. Other actuator arrangements may also be used for moving the reciprocating member 52 in directions D3 and D4 as required.

Actuator 54 may be positioned within or attached to the housing 22, thereby enabling the entire sensor module 20 to be attached to the tailgate sidewall 18c using bolts or other suitable fasteners. Elements of the sensor module 20 such as the sensor 30 and the actuator 54 may then be electrically connected to other portions of the vehicle in a known manner, for purposes of signal and power transmission. Alternatively, the elements of the sensor module may be powered by a power source (such as a battery, for example) (not shown) incorporated into the sensor module 20 and operatively coupled to elements of the sensor module.

Operation of the sensor deployment mechanism 50 to extend and retract the sensor 30 will now be discussed.

Figure 3A:
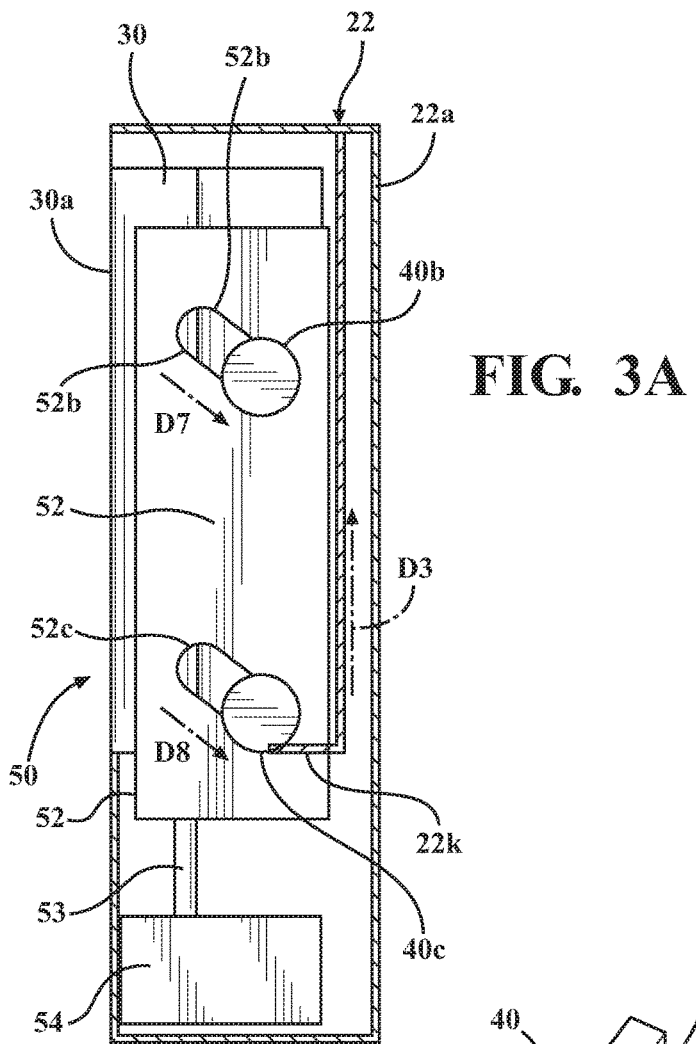
FIG. 3A is a schematic side view of a sensor module in accordance with an embodiment described herein when the sensor is retracted.
Figure 3B:
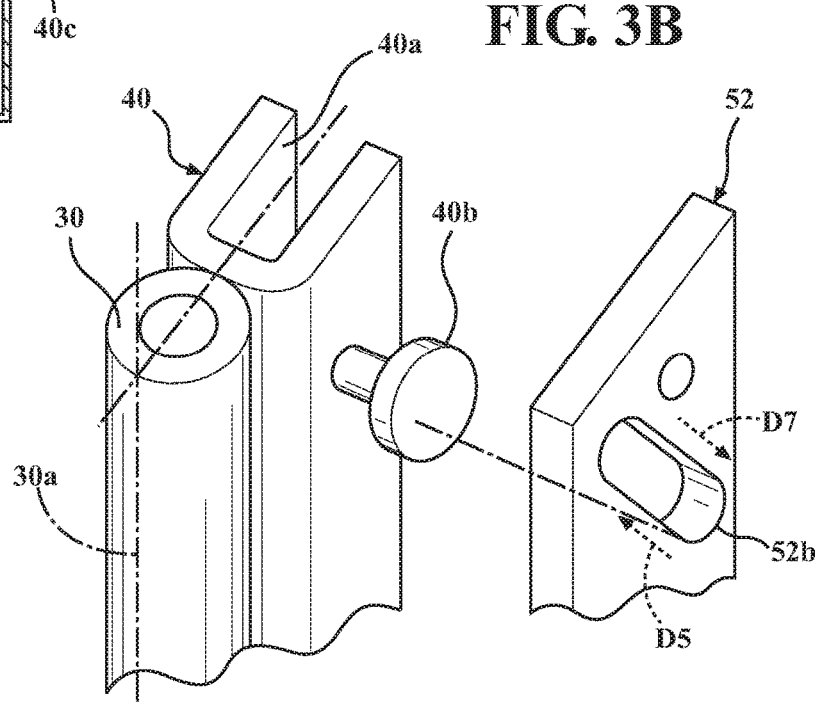
FIG. 3B is a schematic exploded perspective view showing a position that a sensor base projection occupies in a slot of a reciprocating member when the sensor is retracted into the housing.
Figure 4A:
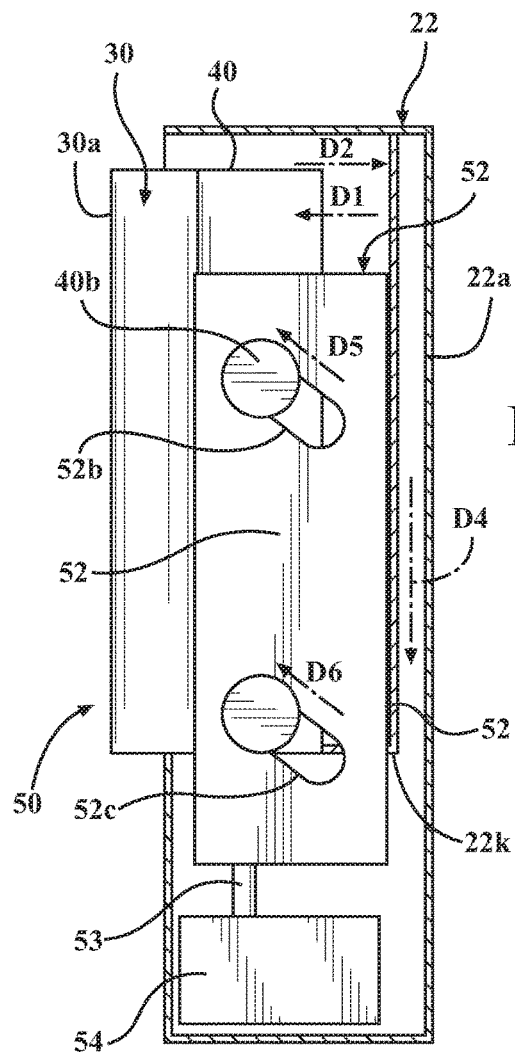
FIG. 4A is the schematic side view of FIG. 3A with the sensor extended.
Figure 4B:
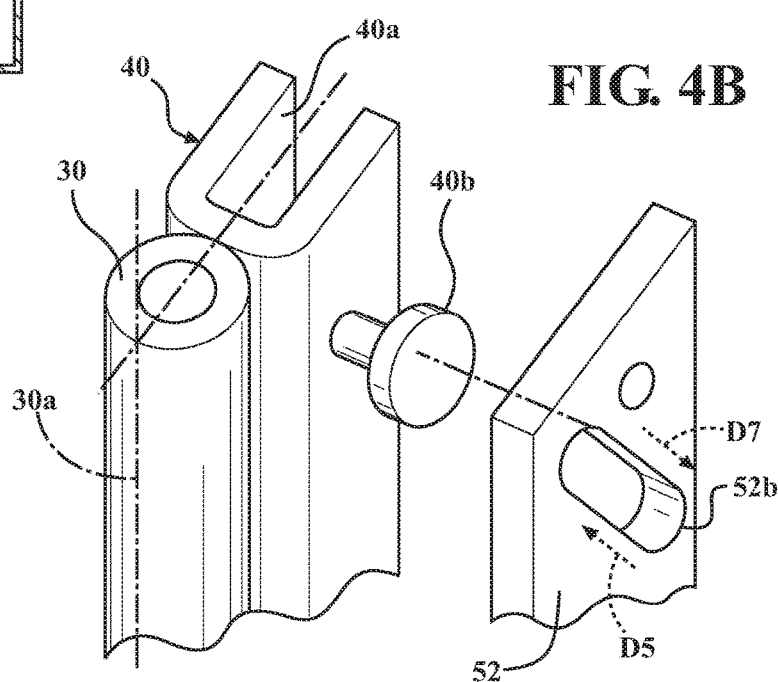
FIG. 4B is the schematic exploded perspective view of FIG. 3B showing a position that a sensor base projection occupies in a slot of the reciprocating member when the sensor is extended from the housing.

FIG. 4A shows the schematic side view of FIG. 3A with the sensor 30 extended. FIG. 4B is the schematic perspective view of FIG. 3B showing the positioning of the sensor base projection 40b in the slot 52b of the reciprocating member 52 when the sensor 30 is extended from the housing 22. Referring to FIGS. 4A-4B, when it is desired to extend the sensor 30, actuator 54 operates to pull the reciprocating member 52 in direction D4, toward the actuator 54. Reciprocating member 52 is constrained by housing 22 (for example, by walls 22a, 22d) so as to be movable only (or substantially only) in reciprocating member directions D3 and D4. As used herein, the term "substantially" includes exactly the term it modifies and slight variations therefrom. Thus, movement of the reciprocating member "substantially only" in reciprocating member directions D3 and D4 means that motion of the reciprocating member 52 in directions other than directions D3 and D4 is minor and unrelated to the purpose of moving the reciprocating member.

In addition, sensor base 40/sensor 30 are constrained by the housing 22 so as to be movable only (or substantially only) in extension direction D1 and retraction direction D2. For example, sensor base 40 may be slidably positioned on a floor 22k (FIGS. 3A, 4A) of the housing 22 designed to support the sensor base 40. In addition, a ceiling or covering wall portion (not shown) may be provided on the an end of the housing 22 positioned near a free or rotating end of the tailgate 18, to confine the sensor base 40 within the housing cavity 22e during extension and retraction of the sensor.

Referring to FIG. 4A, as the reciprocating member 52 moves in direction D4, sensor base projections 40b, 40c are forced along their respective reciprocating member slots 52b and 52c in first projection directions D5 and D6. This movement of the projections 40b, 40c forces the sensor base 40 attached to the projections 40b, 40c to move in extension direction D1, thereby extending the sensor 30 from the housing 22 as shown in FIGS. 1B and 4A.

Referring to FIG. 3A, when it is desired to retract the sensor 30 into the housing, actuator 54 operates to push the reciprocating member 52 in direction D3, away from the actuator 54. The sensor deployment mechanism 50 may be structured so that movement of the reciprocating member 52 in the first reciprocating member direction D3 forces the projections 40b, 40c to move along their respective slots 52b, 52c in second projection directions D7 (opposite direction D5) and D8 (opposite direction D6). Movement of the sensor base projections 40b, 40c along their respective slots 52b, 52c in the second projection directions D7, D8 causes the sensor 30 coupled to the projections 40b, 40c to move in the retraction direction D2. This movement of sensor base 40 in retraction direction D2 moves the sensor 30 into the housing 22 as shown in FIGS. 2B and 3A.

FIG. 3A shows a schematic side view of the sensor module 20 when the sensor 30 is retracted. FIG. 3B is a schematic perspective view showing the positioning of a sensor base projection 40b in a slot 52b of the reciprocating member 52 when the sensor 30 is retracted into the housing 22. As seen in FIGS. 3A and 3B, projections 40b and 40c may reside at or near first (lower) ends of corresponding angled reciprocating member slots 52b, 52c when the sensor 30 is retracted.

Operation of the sensor module 20 during opening and closing of the tailgate 18 will now be described.

Figure 5:
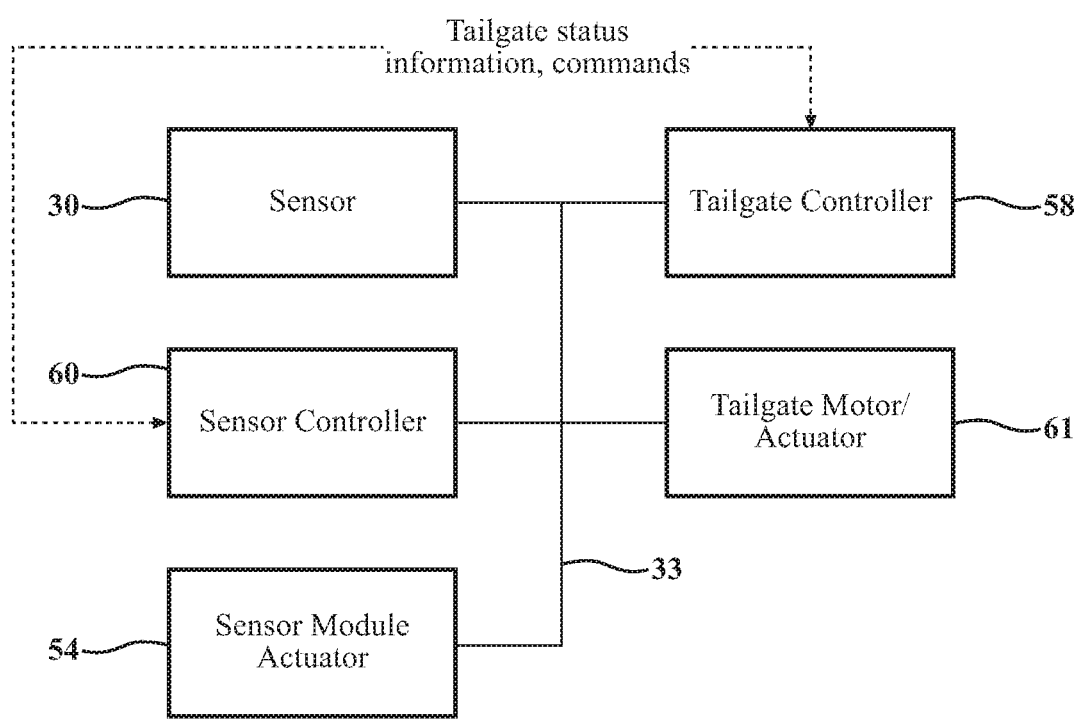
FIG. 5 is a schematic block diagram showing relationships between various elements of the vehicle relating to operation of the sensor module and the tailgate, in accordance with one embodiment described herein.

FIG. 5 is a block schematic diagram showing possible relationships between various elements of the vehicle 17 relating to operation of the sensor module 20 and the tailgate 18. Referring to FIGS. 1A-2B and 5, automatic closing of the tailgate 18 refers to closing of the tailgate by a motor or other mechanism incorporated into the vehicle 17, without direct physical contact between a user and the tailgate or force exerted directly on the tailgate by a user. Connections between the elements shown may be hard-wired or wireless connections.

Operation of the tailgate 18 to close automatically may be controlled by a tailgate controller 58. The tailgate 18 may be structured to close automatically responsive to, for example, a command generated by a user from a control panel, or the shifting of the vehicle transmission to "drive" while the tailgate is down.

Operation of the actuator to extend and retract the sensor 30 may be controlled by a sensor controller 60. The sensor controller 60 may be in communication (via a suitable communications bus 33) with any other elements of the vehicle necessary for performance of the sensor control functions and/or which may facilitate performance of the sensor control functions. Sensor controller 60 may control actuator 54 to extend and retract the sensor as previously described.

Sensor 30 may be configured to transmit a contact signal to the tailgate controller 58 when the sensor contacts an object such as object 99 of FIG. 1B) positioned between the tailgate 18 the vehicle sidewall during automatic closing of the tailgate. The tailgate controller 58 may be configured to stop the closing motion of the tailgate 18 responsive to receiving such a signal. Alternatively, the vehicle 17 may be configured so that a contact signal from the sensor 30 may be transmitted directly to a tailgate motor 61 or other actuator structured to close the tailgate 18, so that the closing motion of the tailgate may be halted as rapidly as possible.

Sensor controller 60 may be configured to extend and retract the sensor 30 responsive to information and/or commands received. For example, the sensor controller 60 may operate the sensor module actuator 54 to extend the sensor 30 when information is received indicating that the tailgate 18 is down and that a command has been issued to automatically close the tailgate. The sensor controller 60 may also be configured to operate the actuator 54 to retract the sensor 30 when information is received indicating that the tailgate 18 is fully closed, thereby obviating the need for the sensor 30 to remain extended.

The tailgate motor/actuator 61 may be operatively coupled to the tailgate 18 and to tailgate controller 58 to automatically close and/or open the tailgate 18 responsive to user commands and/or the occurrence of various conditions.

Sensor controller 60 functions and/or tailgate controller 58 functions may also be incorporated into another controller, such as a general controller for the vehicle 17 which may be in communication with various vehicle sensors and which may control various associated operations of the vehicle.

Figure 6:
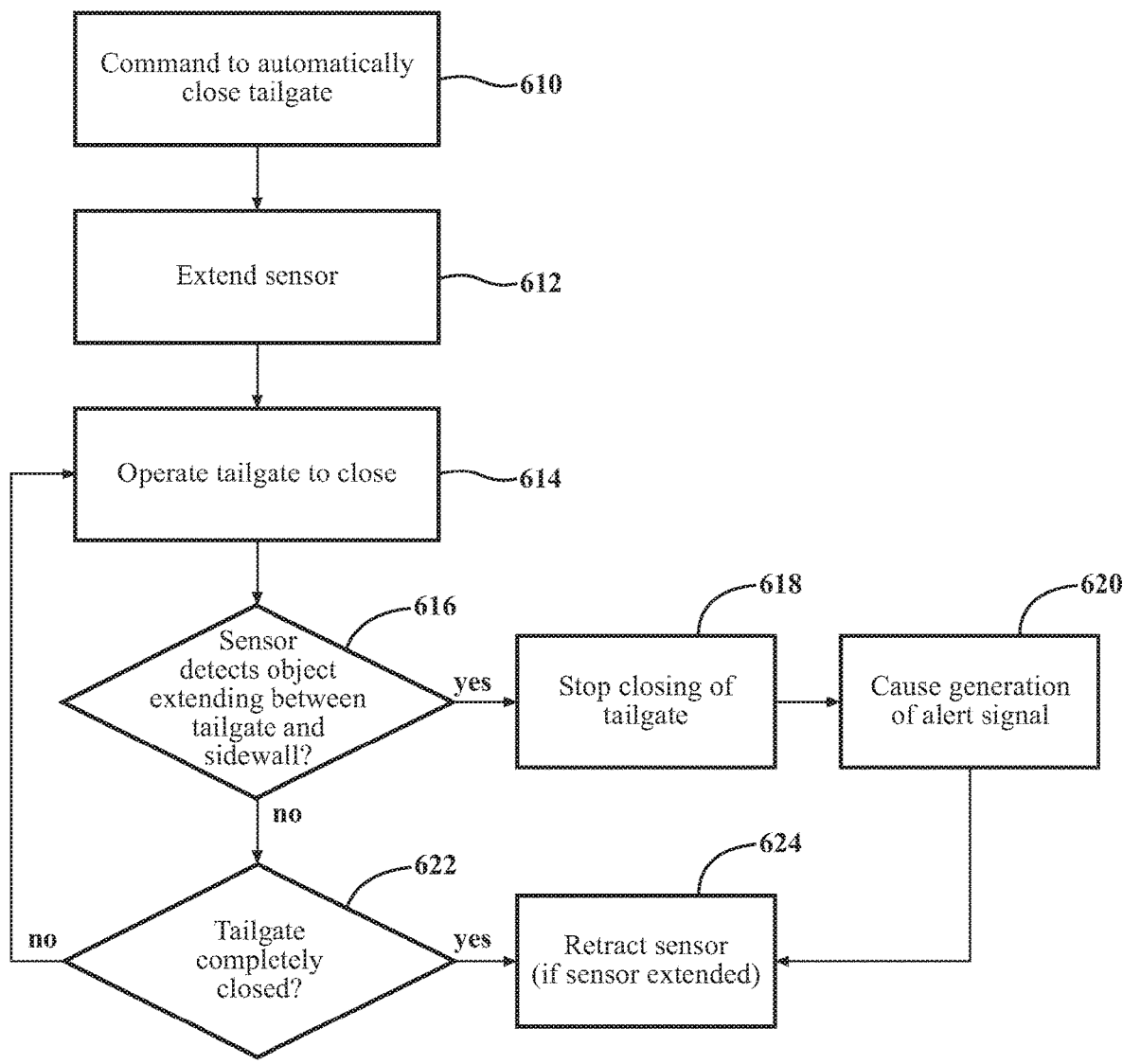
FIG. 6 is a flow diagram describing one exemplary operational mode of the sensor module.

FIG. 6 is a flow diagram describing one exemplary operational mode of the sensor module. Other operational modes are possible.

In block 610, the tailgate controller 58 may receive or generate a command to automatically close an open tailgate 18. The sensor controller 60 may also be configured to receive this command, so that the sensor 30 may be extended prior to closing the tailgate 18.

In block 612, the sensor controller 60 may control operation of the sensor module actuator 54 to extend the sensor 30 in the manner previously described. The sensor 30 may extend to a position where it may contact an object 99 (FIG. 1B) positioned between the tailgate 18 and the vehicle sidewall 17a during closing of the tailgate. The tailgate controller 58 may be configured to delay movement of the tailgate 18 to close until it receives a signal from sensor 30 or from sensor controller 60 that the sensor has been extended.

In block 614, after the sensor 30 has been extended, the tailgate 18 may begin to close. FIG. 1B shows the spatial relationship between the sensor 30 and the vehicle sidewall 17a during closing of the tailgate 18 (in direction D9) and with the sensor 30 extended. As the tailgate closes, the sensor outermost edge 30a (which is the farthest point 30a of extension of the sensor 30 from the housing 22) travels along a plane P1 which is spaced apart a clearance distance C1 from a plane P2 including the portion of the sidewall 17a closest to sensor plane P1. This arrangement ensures that the sensor 30 will always be spaced apart from the sidewall 17a during tailgate movement. In addition, the sensor module 20 may be structured so that the sensor 30, when in its extended position, is positioned so as to contact an object residing in seam 21 prior to any other portion of the tailgate 18 contacting the object.

The tailgate 18 continues to close (in direction D9) until an object (such as object 99) is contacted by the sensor 30, or until the tailgate is completely closed. If (in block 616, FIG. 6) an object 99 residing between the closing tailgate 18 and the sidewall 17a is contacted by the sensor 30, a signal may be generated (in block 618) by the sensor and/or by the sensor controller 60 which causes the closing motion of the tailgate 18 to be stopped. As previously described, the "stop closing" signal may be received by the tailgate controller 58 or by the tailgate motor/actuator 61. In addition, an alert signal (such as an audible alarm, for example) may be generated (in block 620) to alert a user of the blockage preventing closing of the tailgate 18. After generation of the alert, the sensor controller 60 may operate the sensor module actuator 54 to retract the sensor 30, help prevent damage to the sensor during removal of the obstruction 99 by a user. After the obstruction 99 has been removed, the cycle just described may be repeated and the tailgate 18 may continue to close until the tailgate 18 is in the fully closed condition (block 622) shown in FIG. 2B.

If (in block 616) no object is detected in the seam 21, the tailgate 18 may continue to close until it completely closed.

In block 624, when the tailgate is completely closed, the sensor controller 60 may control the actuator 54 to retract the sensor 30 into the housing 22.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . ." as used herein refers to and encompasses any and all possible combinations of one or more of the associated listed items. As an example, the phrase "at least one of A, B and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope of the invention.

What is claimed is:

1. A sensor system for a vehicle, the sensor system comprising:
   a housing;
   a pressure-sensitive sensor mounted in the housing so as to be extendible from the housing and retractable into the housing;
   a sensor deployment mechanism operatively coupled to the sensor and structured to be operable to extend the sensor from the housing and to retract the sensor into the housing; and
   a sensor controller comprising one or more processors for controlling operation of the controller, and a memory for storing data and program instructions usable by the one or more processors, wherein the one or more processors are configured to execute instructions stored in the memory to operate the sensor deployment mechanism to extend the sensor from the housing prior to movement of a cargo door of the vehicle responsive to a command to automatically close the cargo door,
   wherein the one or more processors are configured to execute instructions stored in the memory to retract the sensor into the housing responsive to a determination that the cargo door is in a fully closed position.

2. The sensor system of claim 1 wherein the one or more processors are configured to execute instructions stored in the memory to, responsive to contact between the sensor and an object when the sensor is extended, generate a signal configured to result in stopping of movement of the cargo door.

3. The sensor system of claim 2, wherein the one or more processors are configured to execute instructions stored in the memory to operate the sensor deployment mechanism to retract the sensor after generation of the signal configured to result in stopping of movement of the cargo door.

4. A vehicle including a sensor system in accordance with claim 1.

5. The sensor system of claim 1 wherein the cargo door is a tailgate of a pickup truck.

6. The sensor system of claim 1 wherein the sensor deployment mechanism includes a reciprocating member, wherein the sensor is operatively coupled to the reciprocating member so that motion of the reciprocating member in a first reciprocating member direction causes the sensor to move in an extension direction so as to extend from the housing, and wherein motion of the reciprocating member in a second reciprocating member direction opposite the first reciprocating member direction causes the sensor to move in a retraction direction so as to retract into the housing.

7. The sensor system of claim 6 further comprising at least one projection rigidly coupled to the sensor, wherein the reciprocating member has a slot formed therein, and wherein the at least one projection extends into the slot.

8. The sensor system of claim 7 wherein the slot is structured to extend at a non-zero angle with respect to the first reciprocating member direction and also with respect to the extension direction.

9. The sensor system of claim 7 wherein the sensor deployment mechanism is structured so that movement of the reciprocating member in the first reciprocating member direction forces the at least one projection to move along the slot in a first projection direction, and wherein movement of the at least one projection along the slot in the first projection direction causes the sensor coupled to the at least one projection to move in the extension direction.

\* \* \* \* \*